United States Patent [19]

Asselborn et al.

[11] 3,843,909

[45] Oct. 22, 1974

[54] MOBILE INTEGRATED CABLE SYSTEM FOR COMMUNICATION AND ENERGY-DISTRIBUTION PURPOSES

[75] Inventors: Peter Asselborn, Bergisch-Gladbach; Gerhard Haase, Cologne; Guenther Menne, Leverkusen, all of Germany

[73] Assignee: Felten & Guilleaume Kablewerke Aktiengesellschaft, Koln, Germany

[22] Filed: Feb. 8, 1973

[21] Appl. No.: 330,513

[30] Foreign Application Priority Data

Feb. 18, 1972 Germany.......................... 2207646

[52] U.S. Cl................. 317/99, 317/120, 174/52 R, 307/149

[51] Int. Cl........................................... H02b 1/04

[58] Field of Search............ 317/99, 100, 103, 120; 174/52 R; 307/149

[56] References Cited

UNITED STATES PATENTS

| | | | |
|---|---|---|---|
| 1,959,513 | 5/1934 | Weyandt | 317/100 |
| 3,154,358 | 10/1964 | Blasch | 317/99 |
| 3,457,462 | 7/1969 | Gargala | 317/103 |
| 3,700,834 | 10/1972 | Schaefer | 174/52 R |

FOREIGN PATENTS OR APPLICATIONS

| | | |
|---|---|---|
| 1,214,214 | 12/1970 | Great Britain |
| 579,495 | 8/1946 | Great Britain |

*Primary Examiner*—Robert K. Schaefer
*Assistant Examiner*—Gerald P. Tolin
*Attorney, Agent, or Firm*—Michael S. Striker

[57] ABSTRACT

A transportable container contains all the construction materials, cable components, measuring and testing equipment necessary for the laying of a communications or energy-distribution cable system. The transportable container with its contents constitute a mobile integrated cable system capable by itself of establishing a cable system of the aforementioned types or repairing an existing such system.

6 Claims, 2 Drawing Figures

PATENTED OCT 22 1974

3,843,909

SHEET 2 OF 2

Figure 1:
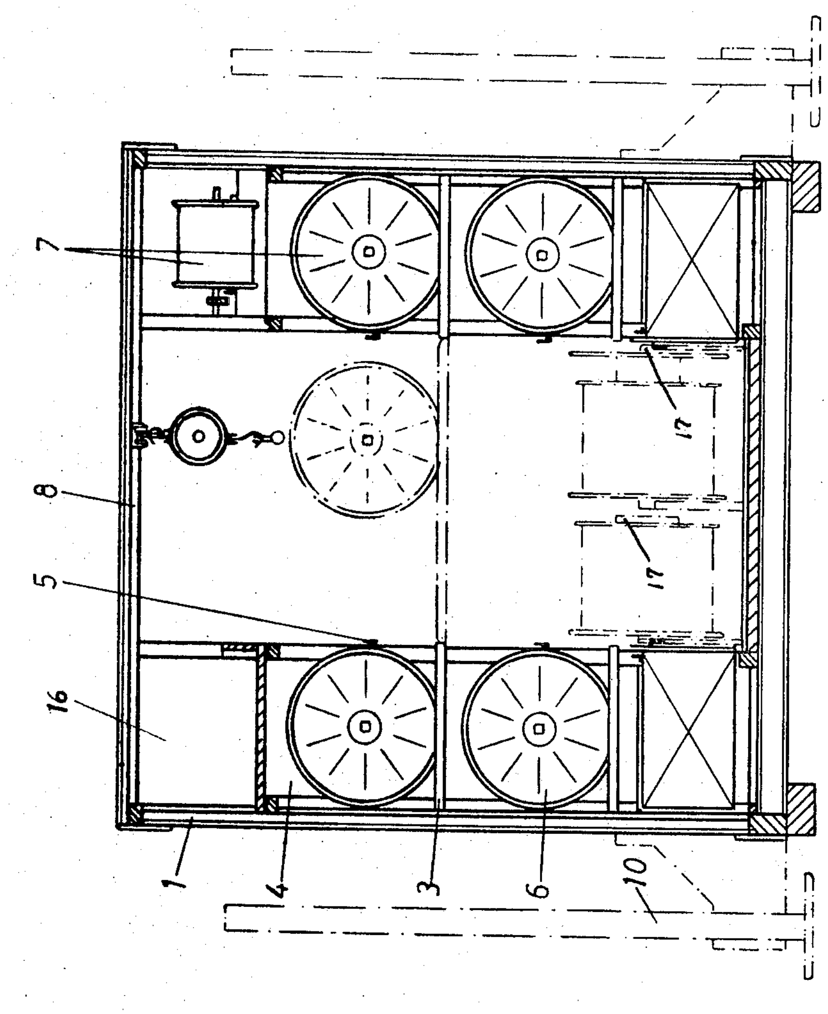
Figure 2:
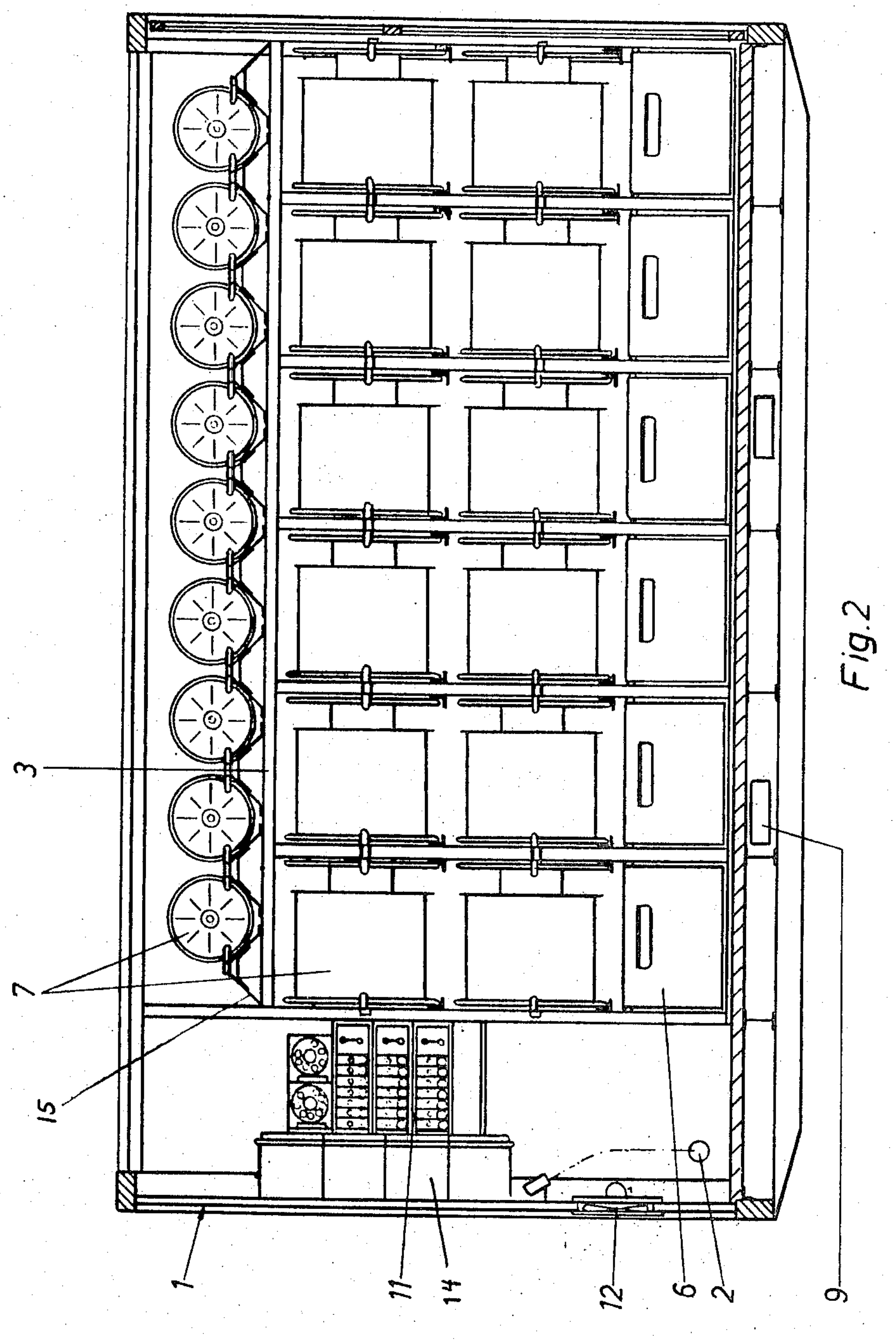

MOBILE INTEGRATED CABLE SYSTEM FOR COMMUNICATION AND ENERGY-DISTRIBUTION PURPOSES

The present invention relates to a mobile integrated cable system for communication and energy-distribution purposes.

Such systems do not yet exist in an optimum form. When laying cable systems, for example telephone and telegraph cable systems as well as power-distribution cable systems, it has hitherto been conventional practice to bring the great variety of components needed for the purpose to the cable-laying site in separate groups, for instance in different trucks each containing one or a few tpes of necessary components. The components being referred to include not only a large supply of cable to be laid, but also electrical measuring and testing instruments used for checking and repairing cable systems, and various other components forming an actual part of the sytem, such as distributing stations, telephone switching stations and exchange terminal boxes for subscribers' extensions, repeaters, and in addition the apparatus actually used to lay the cable, the apparatus for hoisting the larger components, and so forth. It has been customary practice to bring these components individually, or in more or less random fashion, to the construction site, and then at the site itself to modify the components as may be required, operatively interconnect them and then correct them to portions of the system already constructed. By reason of this method of construction, a considerable number of highly-skilled personnel were required at the site to perform a large number of involved assembly operations, before the cable system, or the portion being laid or repaired, actually become operative. This manner of constructing such systems wastes a great deal of valuable time.

It is therefore the general object of the invention to provide a mobile and integrated cable system for communications and energy-distribution purposes which makes possible different methods of cable-system construction.

According to the invention, it is contemplated to achieve this object by providing a large transportable container, in a form adapted to be transported on or pulled by a vehicle, which is specially adapted to contain and in fact contains all or most of the equipment, cable laying apparatus, testing equipment system components, and other auxiliary components, that are actually required for effecting the cable-laying operations.

It is essential for the invention, in this connection, that an electrotechnical storage, - transport, - and distribution unit, for example a container, comprise a strong and rigid frame with sturdy exterior walls, roof and floor, with one or more of the walls being formed as doors, and with some of the doors cooperating with a fold-out flight of stairs leading to ground level, or else with a separate stairway that can be attached to the container at the base of one of its doorways, for example. It is advantageous if the walls have closable openings through which can be passed the cable to be paid out, as well as guide means and holders for the cable located within the transportable container or vehicle, and further if the container is provided with or readily connectable to a hoist or lift, as well with connecting means for connecting sleds, runners or wheels to the container bottom. And it is also advantageous if the container, be provided with spotlights and headlights.

It is further contemplated according to the invention to provide in the container shelves and racks, arranged next to each other, or one behind the other, either unitarily, or composed of smaller units, and built fixed or movable, with compartments and drawer-type storage bins of identical or differing sizes, and to provide on the compartments and on the drawer-type storage bins holding means and locking mechanisms. It is additionally contemplated to provide, for the transport of the individual components having greater weight, special guide rails, and to provide inside the container a crane-guide rail and hoisting mechanism supported from the container roof.

Also, it is contemplated according to the invention to provide in the electrotechnical storage-, transport- and distribution arrangement components for a telephone network, advantageously protected against the influence of nuclear radiation with the individual lengths of the communications cable designed with plugs and/or sockets, and preferably in the form of 60/30/15/10/1 sprial four pairs or 26/13 pairs. It is also most advantageous to provide in the transportable container of the mobile system a telephone exchange or switching central conforming to local regulations and also to provide distributor terminals for the connection of the specially designed cable lengths just mentioned.

It is furthermore contemplated to provide in the electrotechnical storage- transport- and distribution unit, shelves and/or racks for components of a low-voltage energy- distribution network, with the individual cable lengths being of such materials that they remain flexible even at low temperatures, and being available with different numbers of conductors and being provided with connecting means, such as plugs or sockets. Furthermore, it is contemplated to provide the transportable sytem, fixedly installed or removable-as-a-unit energy distributing and provided with connecting means, protection means and measuring instruments.

It is also contemplated to provide the electro- technical storage-, transport- and distribution unit with shelves or racks for fitting, tools, construction materials, laying apparatus, as well as measuring and checking instruments for cable laying in the air, on the ground or in water, depending on the location of the cable system to be laid, as well as pay-out and take-up winding arrangements arranged for the laying of cable during actual transport of the mobile unit.

It is also contemplated that the electrotechnical storage-, transport- and distribution unit be sufficiently large as to include interior walkways for construction and operating personnel, and even that it be so large as to have room for living quarters for such personnel, for which use it would require means for heating, illumination and ventilation, as well as means for the supply of oxygen, if necessary, with the outer walls of the container being provided with a layer of thermal insulation.

It is also contemplated to adapt the unit to be capable of assembling one or more independent cable networks, possibly protected against the effects of nuclear radiation, in their entirety, or only for laying parts of such networks, or for replacing defective parts of such networks, and for assuming a distributing function within the network to be built and generally with electrotechnical installation and repair of communations and high-current networks.

The system of the invention will be used to advantage where a permanent cable network does not exist, or has failed. The cable network is built from modular lengths of cable that are readily connected together in plug-in fashion. Such design makes modifications and enlargements of the system, once established, quite easy, and permits the simple replacement of defective modular cable lengths. The individual cable lengths are wound on drums which are accommodated in the transportable container. The container serves for the storage and transport of the materials and components and when it reaches the construction site it also takes over the function of a telephone exchange and energy-distribution station for the cable systems being worked upon.

The integrated cable system can be used to advantage where for only a short time one or more users requires access to large quantities of electrical energy or access to a communication network. Energy networks and communication networks can be laid next to each other. These installations are also needed at large construction sites, as well as at local meetings, sport events, church fairs, and the like. The communications network is suited also for the connection together of a series of measuring stations, for instance for the purposes of conducting large-scale ecological testing over a sizable geographical region, but only for a limited period of time. Of course, a particularly important use is during emergencies and after natural and other disasters, where the need for the fastest possible set-up of a communications or power network is crucial.

The system is extremely flexible in its utility, and of course the wide choice of cable types ensures its usefulness for the greatest variety of purposes. The container contains all the necessary cable, power equipment, as well as the laying apparatus, measuring instruments, and other tools, and this makes for the greatest possible convenience and the quickest possible construction of urgently needed systems. The container can be placed on the loading surface of a conventional truck without any requirement for additional loading apparatus and then be unloaded at the construction site, at which time the transporting vehicle will be freed for other uses. The weatherproof container remains at the construction site and serves excellently for the storage of the expensive construction materials and system components, and as already mentioned can be adapted to house personnel. The system is expandible without major reconstructions; for example, it can by means of an additional transformer unit be used for the connection of a medium-voltage network. Or, when no power supply is available in the vicinity being worked at, an additional diesel unit can render it completely autonomous, if desired.

According to the invention, it is contemplated to resort to four different groups of cables for the construction of communication networks: a group of unshielded cables meeting the West German Military Specifications for connecting cables, a group of cables having shielding for protection against external influences, meeting the West German Military Specifications for field cables, and a group of shielded cables meeting the United States Military Specifications for cables.

All these cables are flexible and to a certain degree tension-proof. The individual cable lengths are provided at both ends with waterproof connecting means and can be connected at either end to either end of another modular cable length. For each of the aforementioned cable groups the pair numbers 30, 15, 10 and 26, 13 are provided, so that a branching network can be assembled without wasting cable.

The fourth group includes a two-pair cable of the same construction as the cables having larger numbers of pairs, a one-pair communications line, individual wires and detonator lines. All the cables and leads including also the individual wires are wound on drums. Drums of two different sizes are employed.

A telephone exchange can be built into the container and be capable of accepting as many as 30 subscriber extensions. The smallest unit is adapted to supply 10 subscriber extensions. Furthermore, the exchange can be provided with an officially specified attachment for two lines meeting Post Office standards.

For the power cable network rubber-sheathed leads with three or five wires and conductive cross-sections of 2.5, 4 or 6 $mm^2$ are provided. The individual lengths are provided with splash-proof enclosures and with largest cross-sections with water-tight connecting plugs. These cables are connected to the energy-distribution unit by means of plugs and sockets, which are either of a plastic-material encapsulated design built permanently in the container, or set-up as a distributing switchboard exteriorly of the container. In the distributing unit of the container are provided excess-current trips, fault-trips, measuring instruments, and a kilowatt hour meter in the energy line. The distribution arrangement is likewise connected with a terminal box by means of $4 \times 10$ $mm^2$ pluggable cables, from which proceed either four leads to a current take-off means by means of which a connection to a low-voltage overhead line is possible or four connecting leads to a cable distributor. The energy distribution unit also includes three outlets for lighting, ventilation and heating of the container. These outlets can be selectively connected to the 220/380 V bus-bar of the main distribution or to an input for the emergency power supply with a power of 1.5 kVA.

All parts of the integrated special-cable system as well as the accessories necessary for construction and maintenance are preferably provided in a weatherproof container having the following preferred dimensions: length 3,810 mm, breadth 2,080 mm and height 2,710 mm.

The container is constructed in such a manner that it is resistant to torsion deformations and can by means of an externally connected lifting system belonging to the container be raised or lowered to the extent of about 1.5 meters, for example, so that it can be readily loaded upon and unloaded from a truck. The fully provisioned container can be transported on a commercially conventional construction-site vehicle having a loading capacity of at least 4 tons. The external dimensions of the container are chosen in accordance with U.S.A. shelter standards such that it can be shipped on a truck, which in accordance with West German traffic regulations should not exceed the permissible vehicle breadth and also be shippable by air freight. For the transport in roadless areas the container is provided with removable sledge runners.

The individual lengths of the cable system wound on the drums are provided in shelves or racks. For the easy manipulation of the large drums, the container includes a crane runway with a corresponding travelling winch. The materials for the construction of a network and also the accessories are provided in shelves and drawers located at the lower portion of the frame. A telephone exchange or energy distribution unit is built at the rear of the container (as seen from the door), in order not to interfere with the moving of the cable drums. For purposes of illumination, two fluorescent lamps are provided, of which the forward lamp is removable and is connected to a 20-meters long cable for use outside the container. If the container is also to be employed to house personnel, then for heating purposes it will also be provided with two infrared-radiation heating units. Likewise, for purposes of cooling, the container can be provided with fan units. The interior of the container is accessible by way of a two-bladed door provided with a safety-lock arrangement.

For the laying of cable from the large drums a hand-pulled cable-laying trolley is provided. For the small drums one or more cable-laying back-packs are provided. The cable can be laid upon the ground, across trees, across and between buildings, or on specially provided line poles. Two different lengths of line poles as well as cable hooks for mounting and anchoring the cables are associated with the accessories. Also, the cable can be laid along the length of roadways and vehicular paths, right from the vehicle-loaded on container. To this end, in the vicinity of the door, pay-out means for 2 drums are provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The drawing shows an example of a mobile integrated cable system according to the invention.

Reference numeral 1 designates the container walls. Reference numeral 2 designates the passages for cable to be paid out for laying. Reference numeral 3 designates a skeletal support frame. Reference numeral 4 designates adjustable shelves. Reference numeral 5 designates locking and retaining devices. Reference numeral 6 designates pull-out drawers for tools or electrotechnical devices and apparatus. Reference numeral 7 designates cable drums of various types. Reference numeral 8 designates a guide rail with a slidable hoist arrangement. Reference numeral 9 designates connection means for connection to a tractor or other pulling vehicle. Reference numeral 10 designates a lifting mechanism for lifting the container above ground level. Reference numeral 11 designates a telephone switching exchange, and reference numeral 12 designates a ventilating unit. Reference numeral 13 designates a guide rail for transportation of drums. Reference numeral 14 designates a power distribution arrangement. Reference numeral 15 designates a holder for small type cable drums. Reference numeral 16 designates the shelf for large laying apparatus. Reference numeral 17 designates a pay-out unit.

It will be understood that each of the elements described above, or two or more together, may also find a useful application in other types of constructions differing from the types described above.

While the invention has been illustrated and described as embodied in a mobile integrated cable system for communications and power-distribution purposes, it is not intended to be limited to the details shown, since various modifications and structural changes may be made without departing in any way from the spirit of the present invention.

Without further analysis, the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

1. A transportable integrated apparatus for the construction of a cable system, comprising, in combination, a transportable container comprising in the interior thereof a skeletal supporting framework and a plurality of cable drums of different sizes supported on said supporting framework; a complete operative communications system in said transportable container in disassembled form, said communications system including a telephone switching exchange, and also a complete low-voltage energy-distribution system in said transportable container in disassembled form, including a supply of different types of cable provided on said cable drums; means provided in said transportable container for assembling said communications system and for assembling said energy-distribution system, and including an elongated guide rail mounted in said container and a hoist arrangement mounted on said guide rail for sliding movement in said container along the length of said guide rail and operative for hoisting cable drums in said container and moving such drums both in horizontal and vertical direction in said container, and a cable-laying arrangement comprising cable pay-out means for paying out cable from one of the cable drums in said container; and measuring and testing means in said container operative for testing the operation of said communications system and the operation of said energy-distribution system when the latter are assembled.

2. An apparatus as defined in claim 1, wherein said container comprises a rigid frame having exterior walls, a floor and a roof, and wherein at least one of said walls is constructed in the form of a door, such door being at a level above ground level and being provided with stairs leading from ground level to said door, at least some of said exterior walls having openings for the feeding out of cable, and means provided in said container for holding supplies of cable in place, lifting means for the container operative for lifting the container relative to ground level, and connecting means adapted to permit attachment to said container of runner sledges or wheels.

3. An apparatus as defined in claim 2, said supporting framework being provided with shelves and drawers of various sizes and locking and retaining devices.

4. An apparatus as defined in claim 3, wherein said framework supports components of a mobile telephone system shielded against nuclear radiation with at least some of the telephone cables being provided in form of modular cable lengths connectable together in plug-in fashion and further accommodates junction boxes to which said modular cable lengths can be operatively connected.

5. An apparatus as defined in claim 4, wherein said framework accommodates components for a low-voltage energy distribution system, and wherein said modular cable lengths comprise a plurality of leads flexible even at low temperatures and provided with different respective numbers of electrical conductors and having such conductive cross-sections as to be connectable with each other in plug-in manner, and further accommodates an energy distribution unit with connecting elements, protective devices and measuring instruments.

6. An apparatus as defined in claim 5, wherein said container is furthermore adapted to house persons and is provided with heating means, lighting means, ventilating means and means for the supply of oxygen, and wherein the exterior walls of the container are provided with a thermally protective covering layer.

* * * * *